though at conventional calendering temperatures, color degradation is apt to occur. Useful stabilizers are the oxides as well as the inorganic and organic salts of tin, lead, zinc, barium and calcium; the or-

United States Patent Office 2,897,176
Patented July 28, 1959

2,897,176

CHLORINE-CONTAINING RESINOUS COMPOSITIONS AND IMPROVED METHOD FOR PROCESSING THE SAME

Joseph F. Rocky, Union, and Frank R. Nissel, Plainfield, N.J., assignors to Union Carbide Corporation, a corporation of New York No Drawing. Application June 14, 1956
Serial No. 591,290

5 Claims. (Cl. 260—45.5)

This invention relates to chlorine-containing resinous compositions of matter and to an improved method for processing the same. More particularly, the invention is concerned with modified chlorine-containing vinyl resins as new compositions of matter and to an improved method for calendering such materials, at high speeds, to readily heat-sealable films.

It has long been recognized that in the processing of chlorine-containing resinous compositions, as for example, those containing either the homopolymer or a copolymer of vinyl chloride, that due to the adhesive nature of the compositions at processing temperatures, it is necessary to employ compounds normally termed "lubricating agents" to facilitate the release of the product from heated working surfaces. Numerous compounds have been proposed as agents for this purpose and they include such materials as, the natural waxes, oils, fatty acid derivatives and the like. Such heretofore known agents have been of some value in reducing the adhesive nature of vinyl chloride resinous compositions during some processing operations. By way of illustration, the use of the above lubricants have been found satisfactory in extruding operations where the resinous materials, when in a heated state, are forced along or slide against metal surfaces, or in molding operations to overcome the tendency of such materials to adhere to the molds. However, the use of such lubricants has not been found entirely satisfactory in the processing of vinyl chloride resinous compositions into films by calendering operations which involve a shearing and pulling or stripping force on the material. According to our experience, when such heretofore known lubricants are employed in concentrations required to obtain satisfactory release of films from calendering rolls, the lubricants tend to sweat-out of the film and form a grease-like coating on the surface of the product. This sweat-out of the lubricant is not only harmful to the appearance of the film but in addition is detrimental to the heat sealing properties of the film. To illustrate, when excessive sweat-out of the lubricant occurs in calendered films, it has been found that the films are difficult to heat seal by the use of high frequency voltage.

One method for reducing the sweat-out of lubricants from films of vinyl chloride resinous compositions is to decrease the concentration of the lubricant. However, by so doing, the effectiveness of the lubricant in obtaining a release of the film from calendering rolls is diminished while at the same time there is a corresponding and undersiderable increase in the adhesiveness of the composition. Increased adhesiveness of the composition toward such rolls necessitates a reduction in the calendering speed to prevent damage to the film.

The present invention is based upon our discovery that extremely small amounts of polyethylene, when admixed with vinyl chloride resinous compositions provides an improved composition which can be calendered at high speeds, without undue adhesion of the composition toward calendering rolls, into films characterized by essential freedom from sweat-out of the lubricant as well as by their ability to be heat-sealed, particularly by the use of a high frequency voltage, and by freedom from surface irregularities. According to our invention, improved vinyl chloride resinous compositions are prepared by forming a mixture of polyethylene and a vinyl chloride resinous composition in which the polyethylene is present in an amount of less than 0.1 percent, and preferably from about 0.01 to about 0.06 percent, by weight of the composition.

Our improved process for calendering films from vinyl chloride resinous compositions at high speeds into films which can be readily heat-sealed can be carried out by forming a mixture of a vinyl chloride polymer or copolymer resin together, if desired, with one or more of the commonly employed modifiers as for example, a plasticizer, stabilizer and the like, and a small amount of polyethylene and feeding the mixture to a bight of a calendering apparatus whose rolls are rotating at high speeds, calendering said mixture at high speeds to a film and removing the resulting calendered film from the last calender roll. The films produced by our high speed process are substantially free from surface irregularities and can be readily heat-sealed by the use of conductive or high frequency voltage heat sealing apparatus.

We have found that compositions containing amounts of polyethylene of 0.1 percent and above by weight of the vinyl chloride polymer when calendered, suffer from the disadvantage of having the polyethylene plate-out, and form a coating, on the calender rolls, to the extent that the rolls tend to lose their capacity for efficiently processing the composition. In addition, we have found that films prepared from such compositions are subject to sweat-out of the lubricant and cannot be effectively heat-sealed by such widely employed means as high or radio frequency voltage heat-sealers.

The vinyl chloride resinous compositions which can be effectively mixed or compounded with polyethylene to prepare our improved compositions are those normally obtained by compounding a vinyl chloride or vinyl chloride copolymer resin with well known modifiers as for example, plasticizers, stabilizers, pigments, dyes and the like. The copolymer resins are such as are formed by the conjoint polymerization of vinyl chloride with vinylidene chloride or with a vinyl ester of an aliphatic acid as for example, vinyl acetate. Of importance with respect to this invention are those copolymers containing from 70% to 98% of vinyl chloride and from 2% to 30% of a vinyl ester.

Plasticizers which can be employed with vinyl chloride resinous compositions are any of the presently known plasticizers capable of producing elastomeric properties in the polymers. Common commercially used plasticizers which are satisfactory are alkyl phthalates, such as di-(2-ethylhexyl) phthalate, dicapryl phthalate, and dibutoxyethyl phthalate; triphenyl phosphate, and tri-2-ethylhexyl phosphate; polyesters of polyhydric alcohols and fatty acids, such as triethylene glycol di-2-ethyl hexoate, the triethylene glycol esters of coconut oil acids, and the polyesters of glycols and dibasic acids, for example, diethylene glycol adipate and ethylene glycol succinate; mixed esters such as 2-ethyl hexanediol-1,3-adipate acetate; the epoxides, as for example, epoxidized esters and oils and the like, as well as mixtures of such plasticizers.

The vinyl chloride resinous compositions may have admixed or compounded therewith any of the usual pigments and dyes employed for the purpose of coloration. Stabilization of such polymers against actinic and thermal decomposition is desirable, since at conventional calendering temperatures, color degradation is apt to occur. Useful stabilizers are the oxides as well as the inorganic and organic salts of tin, lead, zinc, barium and calcium; the organic phosphites such as triphenyl phosphite; the epoxides such as epoxidized esters and oils and the like.

The chlorine-containing polyvinyl compositions which can be modified and calendered according to the present invention are prepared by any of the known methods. For example, the resin, plasticizer, stabilizer, pigment and dye together, if desired, with other common modifiers may be thoroughly mixed in a Banbury mixer or on a two-roll mill. Once the composition is prepared, the polyethylene may be added thereto and thoroughly mixed therewith. If desired, the polyethylene may be added to the resin simultaneously with the other ingredients and the mixture obtained in a single operation. Actually any method may be employed so long as a uniform distribution of the polyethylene is obtained.

The present invention is particularly applicable to the calendering of films from vinyl chloride resinous compositions having a thickness of from 0.001 to 0.040 inch.

The following examples are illustrative of the present invention:

Example I

A vinyl chloride copolymer resinous composition of the following formulation was prepared:

| | Percent by weight |
|---|---|
| Copolymer (95 percent vinyl chloride, 5 percent vinyl acetate) | 60.3 |
| Dioctylphthalate (plasticizer) | 27.6 |
| Dibutyl tin dilaurate (stabilizer) | 1.1 |
| Pigment | 11.0 |

The composition was divided into two equal parts. To one part was added 0.3 percent by weight thereof of stearic acid (such amount of the lubricant being known not to harmfully affect the heat sealing properties of films prepared therefrom) while to the other part of the composition was added 0.02 percent by weight thereof of polyethylene. The two resulting compositions were then calendered on a conventional four roll calender and it was found that the maximum speed at which the composition containing stearic acid could be calendered without damage to the film was 60 feet per minute. At higher calendering speeds it was found that the film could not transfer properly from the middle calender roll to the bottom calender roll, nor was the release of the film from the bottom calender roll satisfactory. The unsatisfactory release which occurred at calendering speeds above 60 feet per minute resulted in the formation of irregularities in the surface of the film. On the other hand, the composition containing polyethylene could be satisfactory calendered into films, free of surface irregularities, at a speed of 120 feet per minute. At such calendering speed there was no difficulty in transfer of the film from the middle calender roll to the bottom calender roll nor was there any difficulty in obtaining a satisfactory release of the film from the bottom calendering roll.

The improved compositions of our invention can be calendered at high speeds into desirable films on calenders whose rolls have been resurfaced with a dull finish. It is well known that with resurfaced calender rolls there is normally a "break in" period of from 8 to about 24 hours during which time the calendering speed is limited due to the nature of the refinished surfaces. The following example illustrates that the compositions our invention permit higher calendering speeds on resurfaced calendering rolls.

Example II

A vinyl chloride copolymer resinous composition of the following formulation was prepared:

| | Percent by weight |
|---|---|
| Copolymer (95 percent vinyl chloride, 5 percent vinyl acetate) | 67.5 |
| Dioctyl phthalate (plasticizer) | 31.0 |
| Dibutyl tin dilaurate (stabilizer) | 1.5 |

The composition was divided into two equal parts. In one part was added 0.3 percent by weight thereof of stearic acid while to the other part was added 0.02 percent by weight thereof of polyethylene. The two resulting compositions were separately calendered on a newly surfaced four roll calender and it was found that the maximum speed at which a satisfactory film could be obtained from the composition containing stearic acid was 60 feet per minute. On the other hand, it was found that the composition containing polyethylene could be calendered into a satisfactory film at a speed of 100 feet per minute.

The following example illustrates that films prepared from the compositions of our invention by the process described herein possess desirable heat sealing properties as compared with films prepared from compositions outside the scope thereof. More specifically, the following example illustrates that the use of polyethylene in accordance with our invention does not materially harm the heat sealing properties of the resultant film. That is, the amount of polyethylene present in said film is such as to permit the film to substantially retain the heat sealing properties thereof.

Example III

Vinyl chloride resinous compositions were prepared comprising 66.5 parts of a vinyl chloride-vinyl acetate copolymer (95 percent vinyl chloride-5 percent vinyl actate) 32 parts of dioctylphthalate (plasticizer) 1.5 parts of dibutyl tin dilaurate (stabilizer) and respectively containing 0, 0.01, 0.03, 0.10, 0.30 and 1 percent by weight of the composition of polyethylene. Such formulations were calendered on a four roll calendar into films of a thickness of 0.004 inch and were subjected to a conventional laboratory heat sealing test conducted on a 3 kw. RCA sealer. Criteria for the test were established from practical considerations which require the sealing be conducted at radio frequency voltages below 800 volts and that the strength of the resulting heat seal be at least 60 percent of the strength of the film itself. These requirements were established as it was found that when radio frequency voltages above 800 volts were employed arcing occurs across the sealing surfaces of the apparatus and causes damage to the films; while the strength of the heat seal was established as a practical value for such seals.

The films prepared from the above formulations were tested for their heat sealing properties by securing two films, through a 6-inch by ¼-inch seal, on the RCA sealer at various radio frequency voltages to determine the minimum voltage at which a seal having a strength of 60 percent of that of the film itself could be obtained. The table below contains the radio frequency voltages required to obtain such seals for the above formulations:

Formulations containing polyethylene in an amount by percent:

| | Radio frequency voltage |
|---|---|
| 0.0 | 540. |
| 0.01 | 620. |
| 0.03 | 740. |
| 0.10 | 840 (arcing). |
| 0.30 | 920 (arcing). |
| 1.00 | No seal (arcing). |

The data obtained shows that films prepared from formulations containing less than 0.1 percent by weight of polyethylene could be sealed to the desired strength at radio frequency voltages below 800 volts. On the other hand, the data indicates that films prepared from compositions containing 0.1 percent or more of polyethylene could not be sealed to the desired strength without arcing. More specifically, it was found that in order to obtain a heat seal having a strength of 60 percent of that of the film itself from a formulation containing 0.1 percent or more by weight of polyethylene, it was necessary to employ a radio frequency voltage of the magnitude which caused arcing across the sealing surfaces and some damage to the film.

This application is a continuation-in-part of copending United States application Serial No. 307,706, filed September 3, 1952, now abandoned.

What is claimed is:

1. A composition of matter capable of being calendered at high speeds into films comprising a vinyl chloride polymer and polyethylene, said polyethylene being present in an amount of from about 0.01 percent to about 0.03 percent by weight of said vinyl chloride polymer.

2. The composition of matter in claim 1 in which the vinyl chloride polymer is a copolymer of vinyl chloride and vinylidene chloride.

3. The composition of matter in claim 1 in which the vinyl chloride polymer is a copolymer of vinyl chloride and vinyl acetate.

4. A composition of matter capable of being calendered at high speeds into films comprising a vinyl chloride polymer, a plasticizer therefor and polyethylene, said polyethylene being present in an amount of from about 0.01 percent to about 0.03 percent by weight of said vinyl chloride polymer.

5. A composition of matter capable of being calendered at high speeds into films comprising a vinyl chloride-vinyl acetate copolymer containing a plasticizer and polyethylene, said polyethylene being present in an amount of 0.02 percent by weight of said vinyl chloride-vinyl acetate copolymer.

References Cited in the file of this patent

UNITED STATES PATENTS

| | | |
|---|---|---|
| 2,230,000 | Hauffe et al. | Jan. 28, 1941 |
| 2,608,717 | Kay | Sept. 2, 1952 |

FOREIGN PATENTS

| | | |
|---|---|---|
| 985,327 | France | July 17, 1951 |
| 827,552 | Germany | Jan. 10, 1952 |

OTHER REFERENCES

Heyes et al.: Official Gazette, volume 637, page 591, August 8, 1950. Abstract of application Serial No. 88,233.